United States Patent
Cherf (10) Patent No.: US 6,687,849 B1
(45) Date of Patent: Feb. 3, 2004

(54) METHOD AND APPARATUS FOR IMPLEMENTING FAULT-TOLERANT PROCESSING WITHOUT DUPLICATING WORKING PROCESS

(75) Inventor: Gerald Scott Cherf, Jackson, WY (US)

(73) Assignee: Cisco Technology, Inc., San Jose, CA (US)

( * ) Notice: Subject to any disclaimer, the term of this patent is extended or adjusted under 35 U.S.C. 154(b) by 534 days.

(21) Appl. No.: 09/608,047

(22) Filed: Jun. 30, 2000

(51) Int. Cl.[7] .................................................. G06F 11/00
(52) U.S. Cl. .............................................. 714/5; 714/38
(58) Field of Search ........................... 714/5, 6, 10, 12, 714/13, 11, 41, 42, 43, 56, 15, 16, 20, 38; 711/132, 133

(56) References Cited

U.S. PATENT DOCUMENTS

| | | | | |
|---|---|---|---|---|
| 4,819,154 A | * | 4/1989 | Stiffler et al. .................. 714/20 |
| 4,819,159 A | | 4/1989 | Shipley et al. ............... 364/200 |
| 4,907,232 A | | 3/1990 | Harper et al. .................. 371/36 |
| 4,959,774 A | * | 9/1990 | Davis ............................ 714/6 |
| 5,235,700 A | * | 8/1993 | Alaiwan et al. ............... 714/13 |
| 5,287,492 A | | 2/1994 | Reynders ..................... 395/575 |
| 5,473,771 A | | 12/1995 | Burd et al. ............. 395/182.02 |
| 5,533,188 A | | 7/1996 | Palumbo ................. 395/182.02 |
| 5,576,945 A | | 11/1996 | McCline et al. ............. 364/131 |
| 5,590,274 A | | 12/1996 | Skarpelos et al. ...... 395/182.05 |
| 5,748,882 A | | 5/1998 | Huang .................... 395/184.01 |
| 5,978,933 A | | 11/1999 | Wyld et al. ................... 714/13 |
| 6,023,772 A | | 2/2000 | Fleming ....................... 714/13 |
| 6,035,415 A | | 3/2000 | Fleming ....................... 714/11 |
| 6,044,475 A | * | 3/2000 | Chung et al. ................. 714/15 |
| 6,141,773 A | * | 10/2000 | St. Pierre et al. ............. 714/20 |
| 6,256,751 B1 | * | 7/2001 | Meth et al. .................... 714/15 |
| 6,332,199 B1 | * | 12/2001 | Meth et al. .................... 714/13 |
| 6,338,126 B1 | * | 1/2002 | Ohran et al. ................ 711/162 |

* cited by examiner

*Primary Examiner*—Nadeem Iqbal
(74) *Attorney, Agent, or Firm*—Ritter, Lang & Kaplan LLP (57) ABSTRACT

Systems and methods for implementing a memory-efficient fault tolerant computing system are provided. A generic backup process may provide fault tolerance to multiple working processes. The backup process need not include a copy of the code segments executed by the working processes, providing very large savings in memory needed to implement the fault tolerant system. Alternatively, multiple backup processes provide fault tolerance but need not include duplicated code segments for the working processes they support.

38 Claims, 12 Drawing Sheets

Broad Overview of Method

Working Process Message

| File Handle 410 | 420 Stack Info | 430 MUP | 431 MUP | 432 MUP | 433 MUP |
|---|---|---|---|---|---|

FIG. 8

File Handle and Stack Information

(architecture dependent)

◄──── File Handle ────►◄──── Stack Info ────►

| Index 511 | Program counter value 521 | Environmental information 523 | Stack frame marker 525 |
|---|---|---|---|

FIG. 9

Memory Update Package (MUP)

| Address 611 | Type (e.g. Stack, Heap, Kernel) (Architecture dependent) 613 | Length 615 | data 617 |
|---|---|---|---|

METHOD AND APPARATUS FOR IMPLEMENTING FAULT-TOLERANT PROCESSING WITHOUT DUPLICATING WORKING PROCESS

The present invention relates to fault-tolerant computer systems. In particular, it relates to reducing the memory required to operate a fault-tolerant system.

Processes run on computers are used to obtain many useful results. For instance, computer processes can be used for word processing, for performing calculations, for banking purposes, and for routing messages in a network. A problem with computer processes is that sometimes a process will fail. Although for some programs failure may have minimal negative consequences, in other cases, such as a banking application, the negative consequences can be catastrophic.

It is known to use fault tolerant processes to enable recovery from failure of a process. In particular it is known to use traditional process pairs where one process is the working process doing work and the other process is essentially a clone of the working process that takes over if the working process fails. See e.g. "Transaction monitor process with pre-arranged modules for a multiprocessor system", U.S. Pat. No. 5,576,945, issued Nov. 19, 1996. The working process at intervals sends information about its state ("checkpoints") to the backup process. (In process pairs, a checkpoint is sent at a minimum when an external state relating to the process is changed, such as when a file is opened or when a banking program does a funds transfer. Usually checkpoints are sent much more frequently, however.) Upon failure, the backup process begins execution from the last checkpointed state.

A problem with using traditional process pairs is that because a redundant process is set up about double the memory of running a single process is required. A copy of the contents of the memory image of the working process is created by the clone, including the state of the working space memory such as the stack. A copy of the program ("code segment") is also maintained in memory. The code segment typically is an object file read from disk and loaded into memory at run time, and executed. The code segment is typically a relatively large portion of the memory image copy.

Memory is expensive and also takes up space. Accordingly, it would be advantageous to have a way to run fault-tolerant processes using less memory. It would further be advantageous for the time to takeover for a failed process to be short.

SUMMARY OF THE INVENTION

Systems and methods for implementing a memory-efficient fault tolerant computing system are provided by virtue of one embodiment of the present invention. A generic backup process may provide fault tolerance to multiple working processes. The backup process need not include a copy of the code segments executed by the working processes, providing very large savings in memory needed to implement the fault tolerant system. Alternatively, multiple backup processes provide fault tolerance but need not include duplicated code segments for the working processes they support.

In one embodiment, backup processes maintain state information about each working process including the contents of stack memory and heap memory. Checkpoint messages from a working process to a backup process keep the state information updated to facilitate takeover on failure. At takeover on failure, a backup loads a code segment associated with the working process and resumes using the current backup state information. With recent advances in processor speed, loading of the code segment occurs very quickly.

In one embodiment, a method for recovery of an original working process upon failure is provided. State information associated with the original working process is obtained. A copy of a code segment associated with the original working process is obtained and loaded into memory. The code segment is caused to execute as an active working process, using the state information.

A further understanding of the nature and advantages of the inventions herein may be realized by reference to the remaining portions of the specification and the attached drawings.

DESCRIPTION OF SPECIFIC EMBODIMENTS

Embodiments of the invention are described below with reference to specific processing systems and methods. However, embodiments of the invention can be implemented in various ways. For example, aspects of the invention can be implemented in software or hardware or using special purpose processors or by any other known mechanism. Therefore, the description of the embodiments that follows is for purposes of illustration and not limitation.

Figure 1:
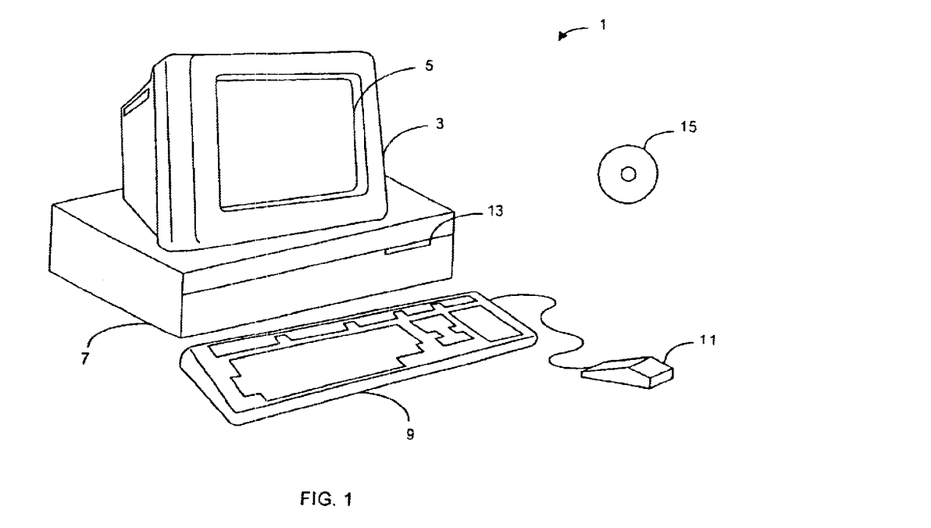
FIG. 1 illustrates an example of a computer system that can be utilized to execute the software of an embodiment of the invention.

FIG. 1 illustrates an example of a computer system that can be used to execute software implementing a portion of a method of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
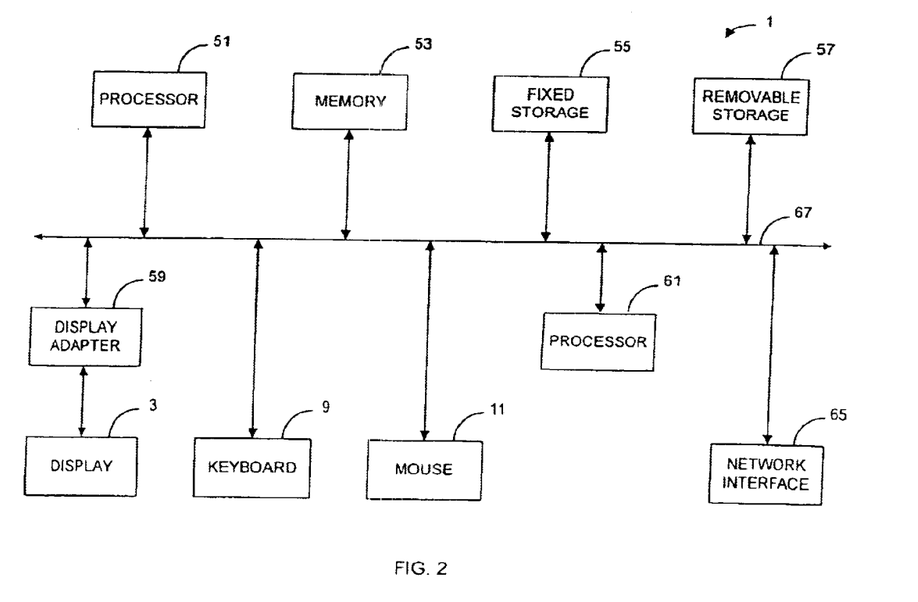
FIG. 2 illustrates a system block diagram of the computer system of FIG. 1.

FIG. 2 shows a system block diagram of a computer system 1 that can be used to execute software implementing a portion of a method of an embodiment of the invention. As in FIG. 1, computer system I includes monitor 3 and keyboard 9, and mouse 11. Computer system 1 further includes subsystems such as a central processor 51, additional central processor 61, system memory 53, fixed storage 55 (e.g., hard drive), removable storage 57 (e.g., CD-ROM drive), display adapter 59, and network interface 65. Processors 51, 61 share memory 53. Other computer systems suitable for use with the invention can include additional or fewer subsystems. For example, another computer system could include additional processors or a cache memory, or could have a single processor (i.e. a uniprocessor system rather than a multiprocessor system). Also by way of example, where an embodiment of the invention is practiced in a router, some elements such as the mouse and keyboard can be eliminated and multiple network interfaces and packet memory can be included.

The system bus architecture of computer system I is represented by arrows 67. However, these arrows are illustrative of any interconnection scheme serving to link the subsystems. For example, a local bus could be utilized to connect the central processor to the system memory and display adapter. Computer system I shown in FIG. 2 is but an example of a computer system suitable for use with the invention. Other computer architectures having different configurations of subsystems can also be utilized.

Figure 3:
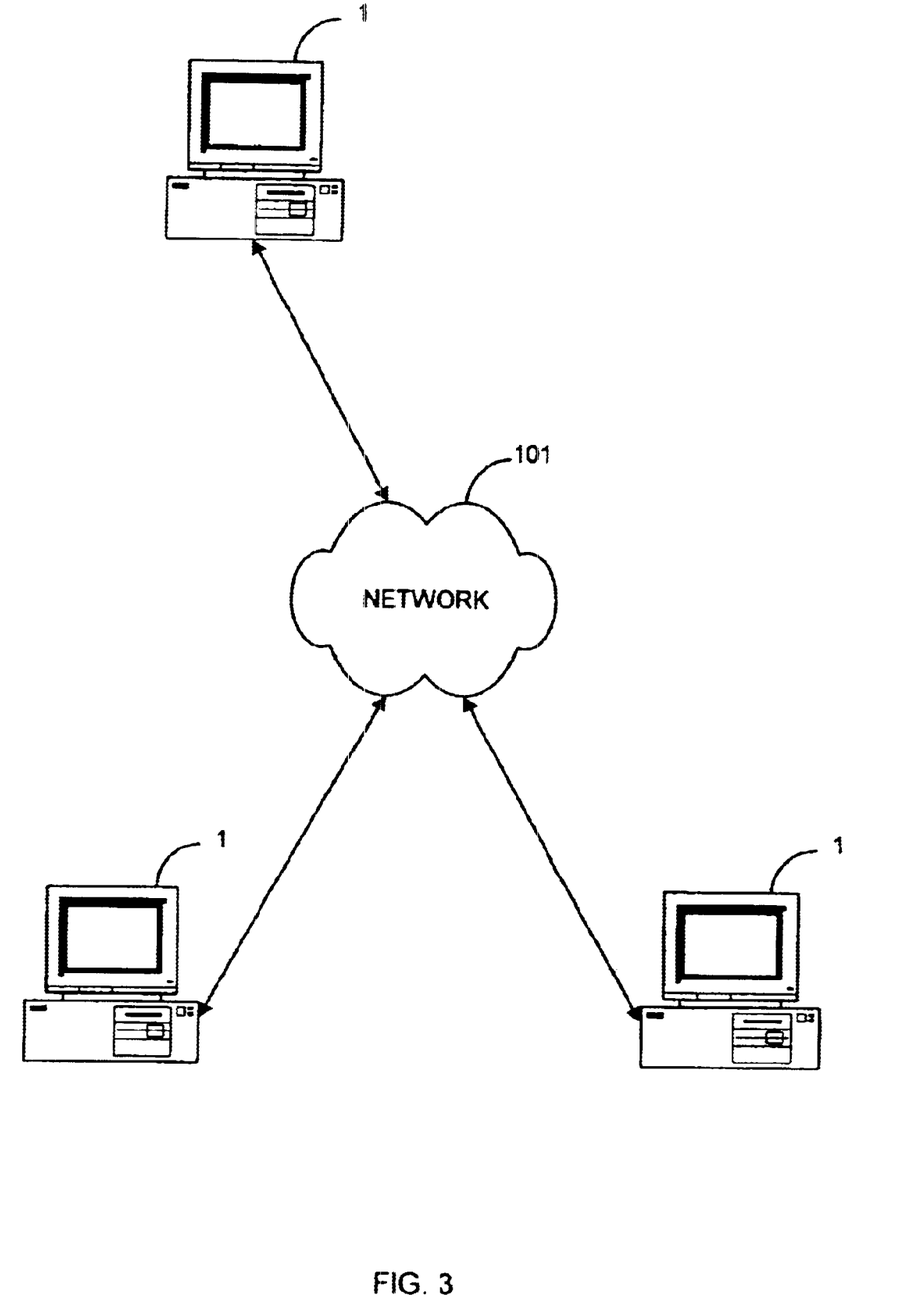
FIG. 3 illustrates a network of multiple computer systems such as the Internet.

FIG. 3 shows a schematic drawing of a network of multiple computer systems. A network 101 provides communication between multiple computer systems 1. In an embodiment of the invention, such multiple computer systems 1 can act as a computer executing one or more working processes, generic backup processes, or monitor/restarter processes, or can provide safe storage. Such multiple computer systems I can include computer systems such as shown in FIG. 1 and FIG. 2.

Figure 4:
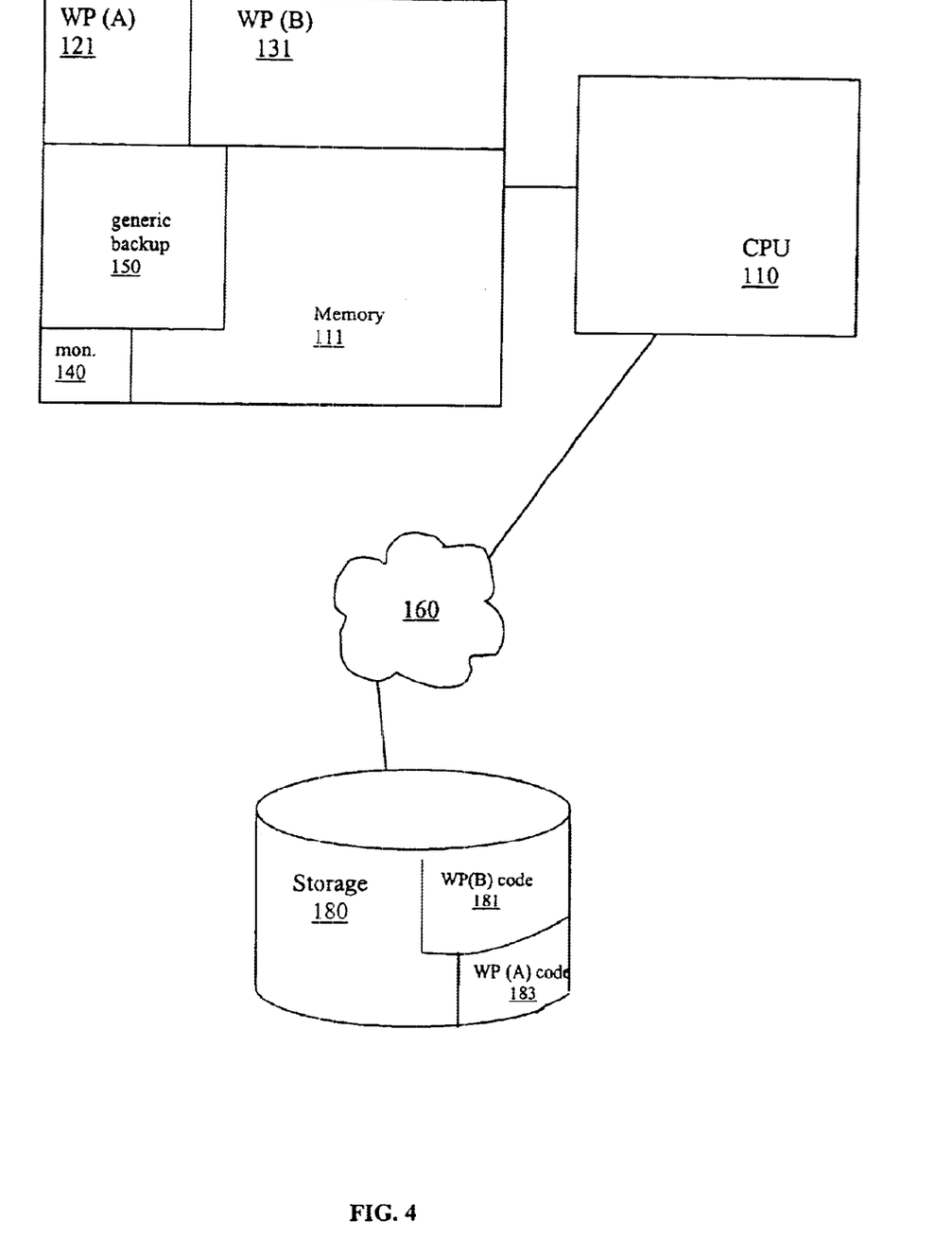
FIG. 4 is a schematic drawing of an embodiment of the invention.

FIG. 4 shows a uniprocessor system capable of implementing an embodiment of the invention. A processor 110 is coupled to memory 111. A processor 110 can access at least one safe storage 180. In FIG. 4 the access to the storage is shown as being through a network 160, though the access can be by any known means including direct connection. Safe storage 180 preferably is nonvolatile storage such as a hard disk, CD-ROM, optical disk, or tape. There can be multiple safe storages; e.g., each processor can have an attached hard disk.

One or more working processes can run on the processor 110 in memory 111. FIG. 4 shows memory including two working processes (A) 121, and (B) 131 running on the processor 110. A generic backup 150 is shown as a process running in memory on a processor 110. A monitor/restarter 140 is shown as a process running in memory on processor 110. One or more generic backups 150 or monitor/restarters 140 can run on a processor, depending on the implementation. The relative amounts of memory taken by the various processes 121, 131, 150, 140 can vary and FIG. 4 is merely a schematic illustration, not necessarily to scale. Note that although the various processes are shown in a single memory 111, they can be divided among multiple memories in the same system (not shown), or each process can be loaded onto a separate system (not shown), e.g. such systems as those shown in FIG. 2.

In one embodiment, program code associated with each working process 181, 183 is stored in safe storage 180. In another embodiment, program code associated with various original working processes can be stored on different safe storage units. In another embodiment program code associated with each working process running on a processor can be stored on a hard disk connected to the respective processor, e.g. a code segment 181 associated with a first working process running on first processor 110 can be stored on a hard disk (not shown) attached to the first processor 110.

Figure 5:
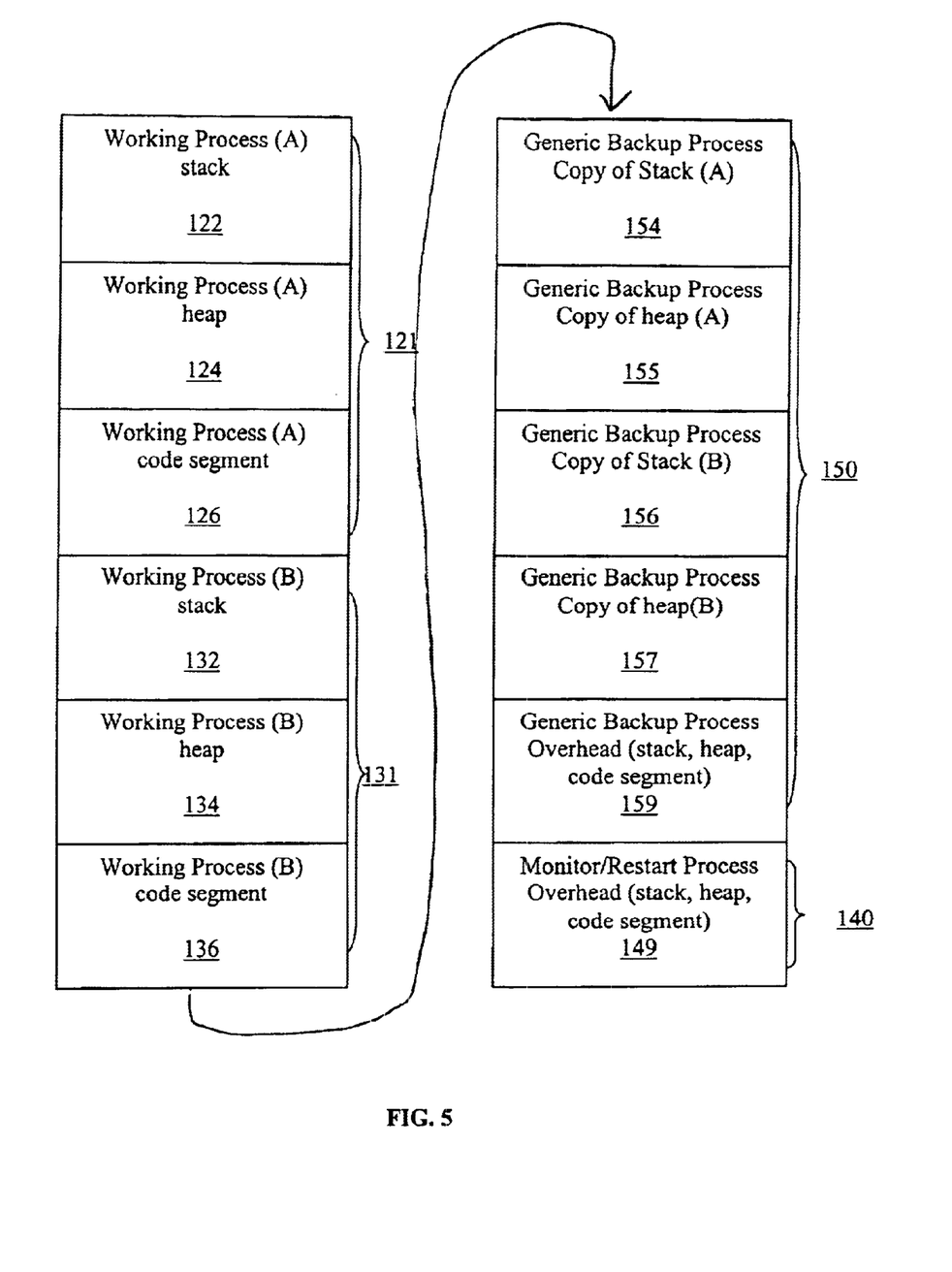
FIG. 5 illustrates a memory in an embodiment of the invention.

Referring to FIG. 5, details of memory on processor 110 associated with an embodiment of the invention shown in FIG. 4 are shown. The memory associated with each executing process includes a code segment and dynamic memory. The memory associated with executing working process (A) 121 includes a stack (A) 122, a heap (A) 124, and a code segment (A) 126. Similarly, memory associated with the executing working process (B) 131 includes a stack (B) 132, a heap (B) 134, and a code segment (B) 136. Relative sizes of stack, heap, and code segment depend on the individual working process. The generic backup 150 also has an associated stack, heap, and code segment 159. The monitor/restarter 140 also has an associated stack, heap and code segment 149. Although we use the terms stack and heap, other terms can be used for the portions of dynamic memory used by a program. In some architectures no heap is maintained. In some architectures a kernel segment is maintained (not shown).

The generic backup process 150, in addition to its own memory overhead such as the stack, heap, and code segment, has backup memory images for each working process that is being backed up. In FIG. 5, this is shown as a copy of stack (A) 154, copy of heap (A) 155, copy of stack (B) 156, and copy of heap (B) 157. The generic backup process 150 does not keep a backup image of the code segment (A) 126 or code segment (B) 136.

The generic backup 150 and monitor/restarter 140 are preferably implemented in software and run as processes. The functions performed by the generic backup 150 and monitor/restarter 140 can be combined and performed by a single process, or the functions can be divided between the generic backup 150 and monitor/restarter 140 differently than described below, or can be further divided and performed by a multiple processes.

Figure 6:
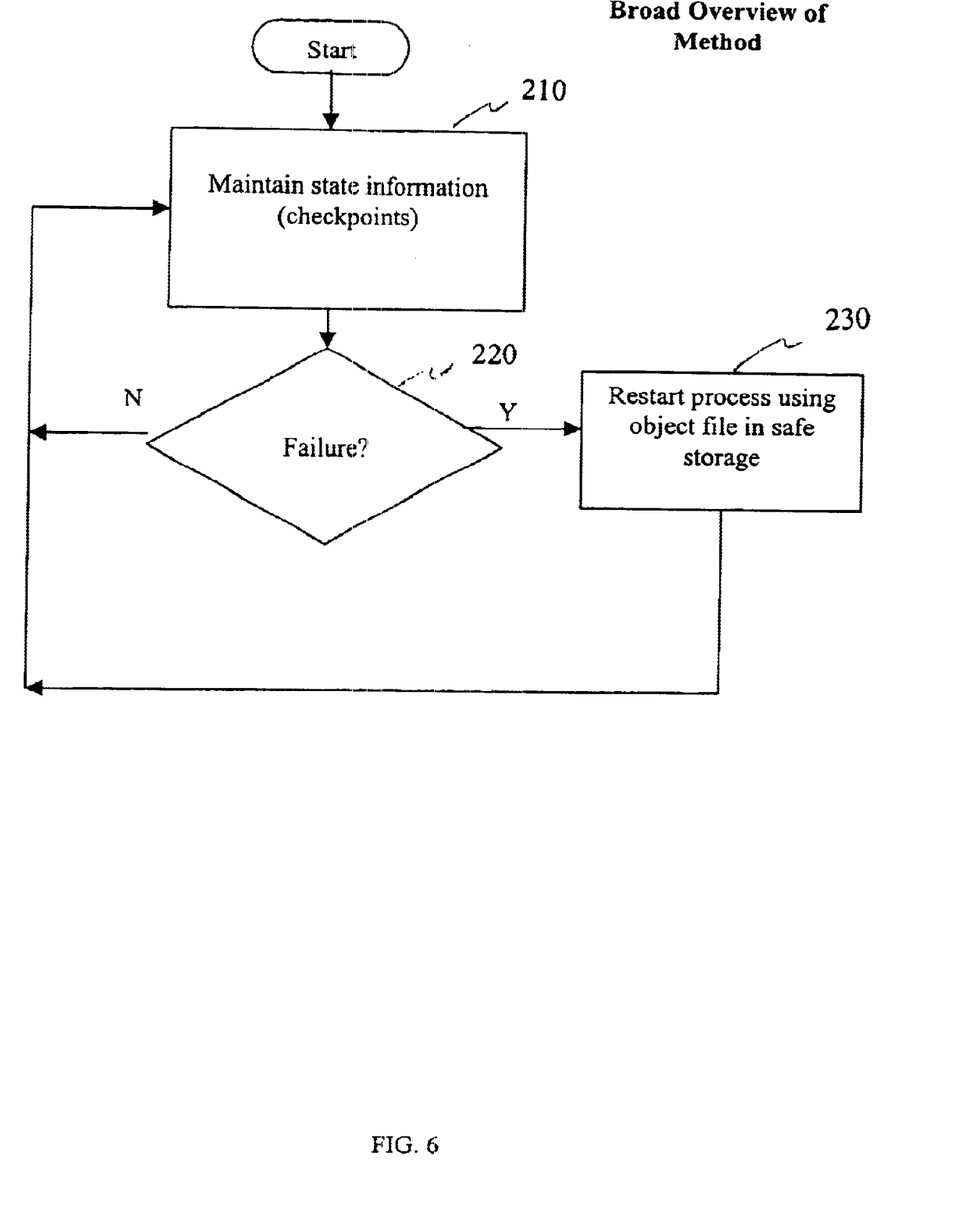
FIG. 6 is a process flow diagram illustrating a broad overview of an embodiment of the invention.

A very broad overview of a method of practicing one embodiment of the invention is shown in FIG. 6. Details of this method are discussed subsequently. State information about a working process is maintained at a step 210. In a preferred embodiment, the original working process sends checkpoints to a generic backup process. If the original working process has successfully concluded, the memory associated with maintaining state information is released (not shown). At a decision step 220 it is determined whether the original working process has failed. If failure has occurred, the process is restarted using the object file in safe storage and stored state information at a step 230. If failure has not occurred, the method continues to maintain state information 210.

Figure 7:
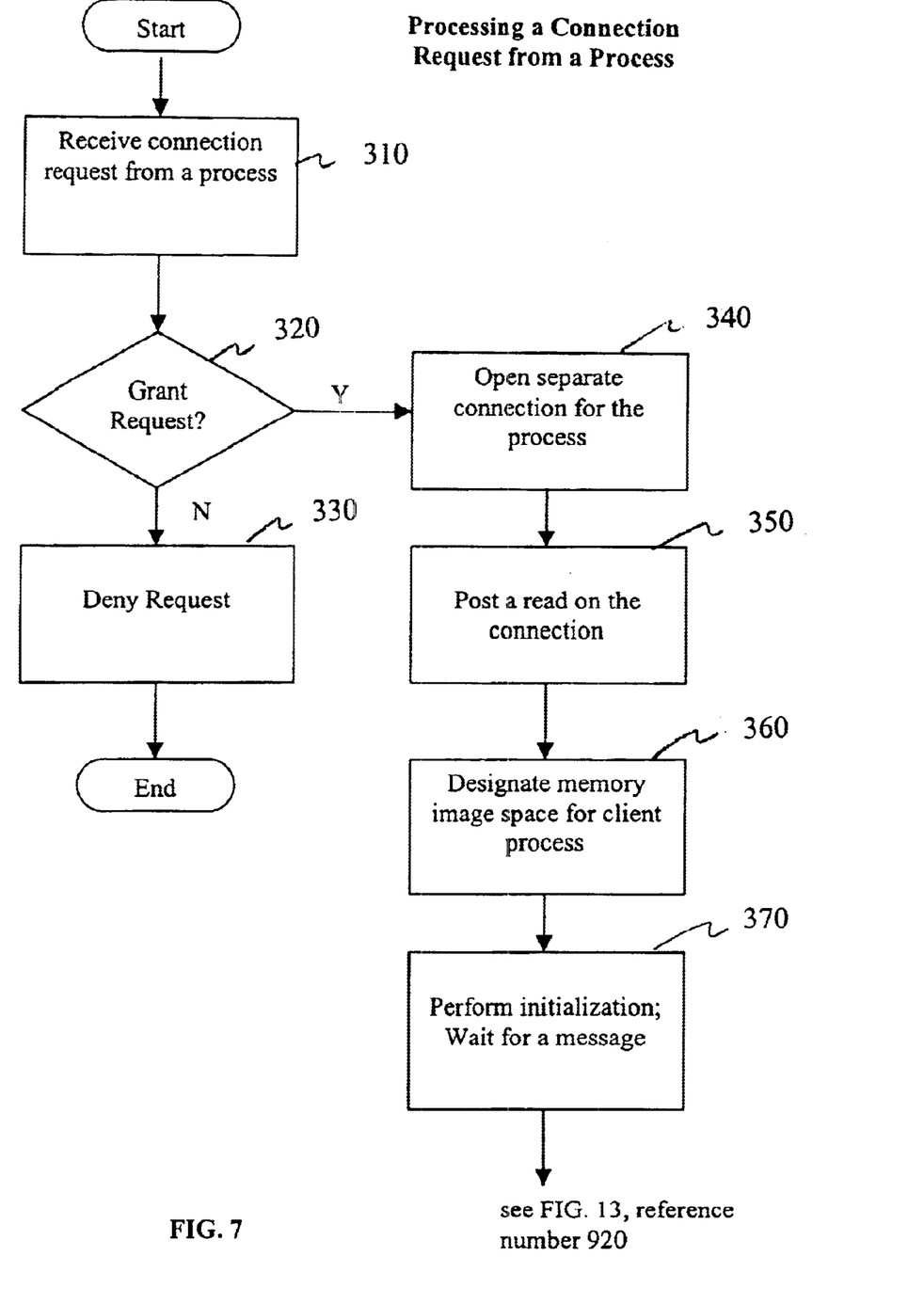
FIG. 7 is a process flow diagram illustrating processing of a connection request from a working process to the generic backup process.

FIG. 7 is a process flow diagram illustrating how a generic backup process can handle a connection request from an original working process. The generic backup process receives a connection request from an original working process 310. At a decision step 320 it is decided whether to accept the request. Reasons for denying a request can include insufficient memory resources. If the decision result is to deny the request, the request is denied 330. If the decision result is to accept the request, a separate connection for the process is opened 340. In one embodiment, the connection is a IPC (interprocess communication) pipe, as known in the art. The generic backup process posts a read on the connection 350, designates memory space for the original working process 360 ("designated memory space"), performs initialization including sending information sufficient to identify the memory segment that belongs to the original working process, and waits for a message 370. Any information sufficient to identify the working process can be used, and for example ways to identify the working process can include using the name of the object file that contains the code segment for the process (assuming there is only one active copy of the process on a system), using a "magic number" or "cookie" that identifies the working process, or some combination of using the name of the object file and a "magic number" or "cookie".

One embodiment of a message from a working process is illustrated in FIG. 4. The message structure is architecture dependent. The message includes a file handle 410, stack information 420, and zero or more memory update packages ("MUPs") 430–433.

Figure 8:
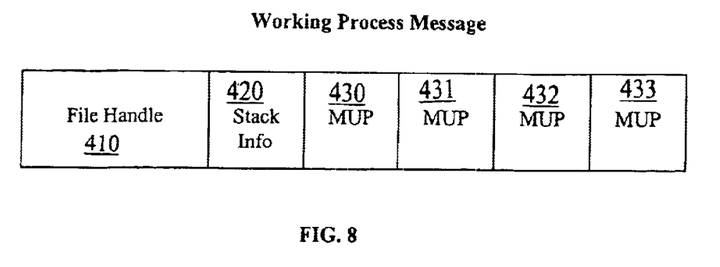
FIG. 8 is a schematic illustration of a working process message in one embodiment.
Figure 9:
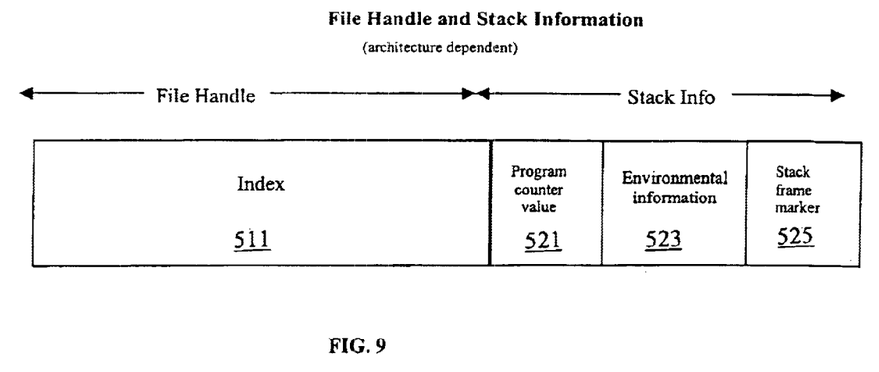
FIG. 9 is a schematic illustration of file handle and stack information included in a working process message.

Referring to FIGS. 8 and 9, the file handle 410 preferably includes an index into the designated memory space or other information 511 sufficient to uniquely identify a session between the backup and its client (i.e. the working process). The file handle used can be operating system dependent, and can be used to identify the memory associated with the original working process by the generic backup process. The stack information 420 in one embodiment includes a program counter value (also known as a "program register", "p register", or "program counter") 521, environmental information 523, and a stack frame marker 525. The stack frame information is architecture dependent. For instance, in some machines there is machine state that is desirable to be stored, and the environmental information can include information such as whether or not the original working process is executing in a kernel segment or a user segment, or whether or not the original working process is executing with interrupts on or off. Some architectures do not include a stack frame marker. In an alternate embodiment, only the program counter value included in the stack information.

Figure 10:
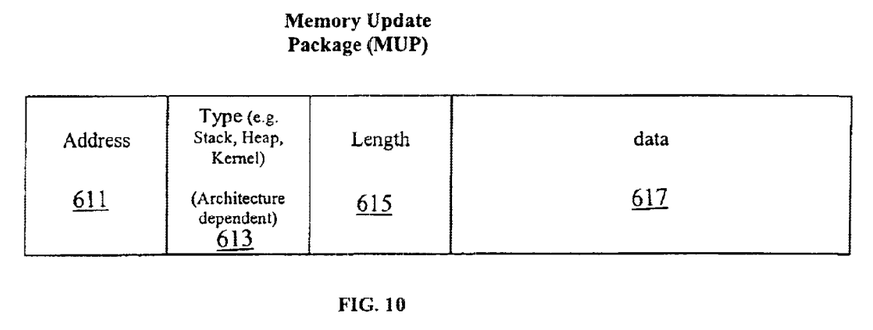
FIG. 10 is a schematic illustration of a memory update package (MUP).

FIG. 10 is an illustration of an embodiment of a memory update package ("MUP") The MUP preferably is in a structured format, including an address 611, type field 613, length field 615, and data 617. The address 611 enables the memory space into which the data should be written to be identified. In a preferred embodiment, the system includes virtual memory computers wherein the address spaces for the original working process and the memory space associated with the original working process by the generic backup process ("designated memory space") are identical; i.e., both have the same base address for their respective stack, heap (if any), kernel (if any), or other memory segments (if any). The type field 613 preferably is included and tells what type of memory is included in this MUP, e.g. stack, heap, kernel. The type is architecture dependent. The length field 615 tells how much data follows in the data 617, e.g. how many bytes.

Figure 11:
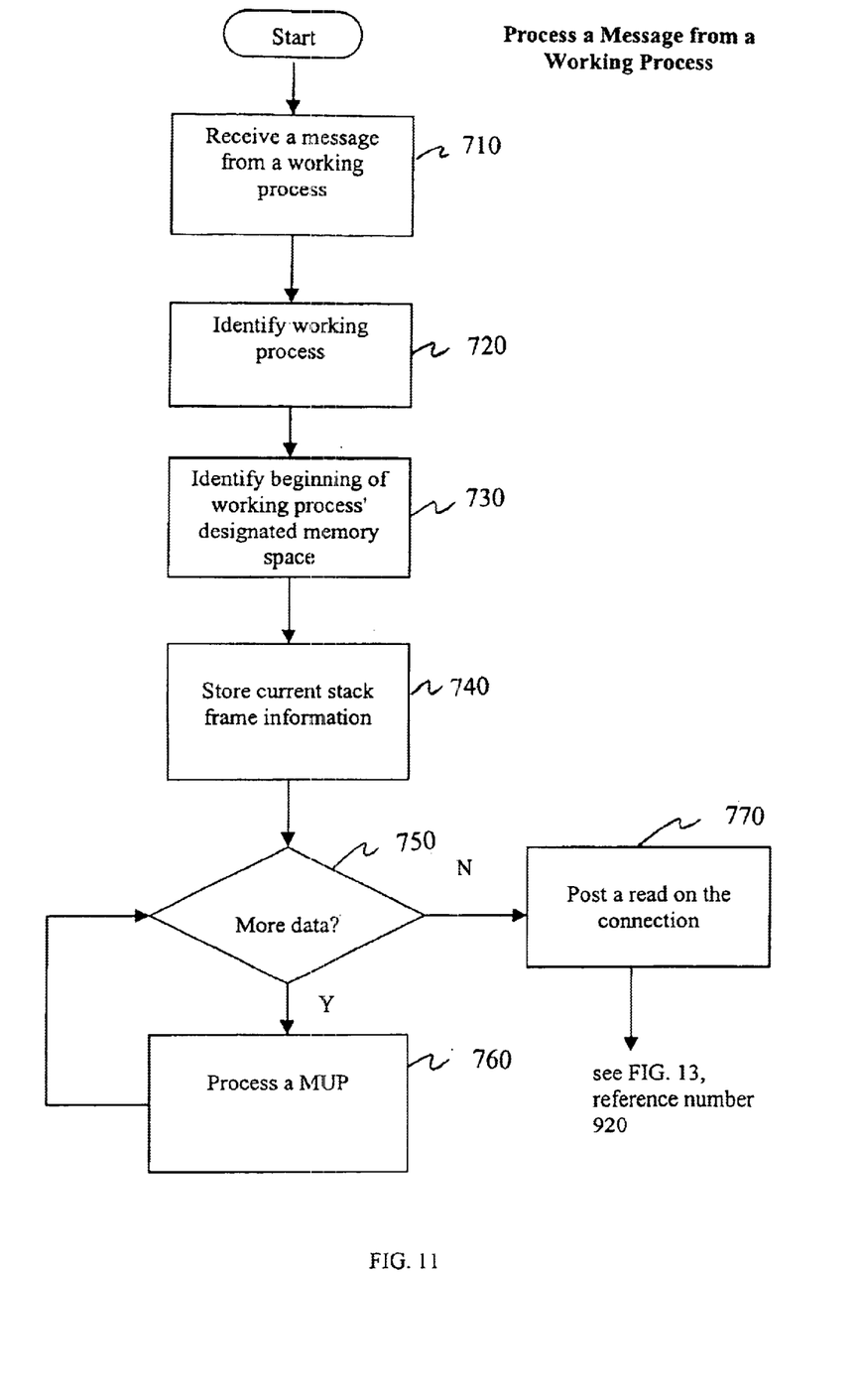
FIG. 11 is a process flow diagram of processing a message.

FIG. 11 illustrates a method for processing a message by the generic backup process.

A message is received at a step 710.

At a step 720, the working process is identified. In one embodiment, the message file handle is used to identify the working process. Most (if not all) computer based file systems provide a unique file handle for each connection between two entities, and it is convenient to use the file handle to uniquely identify a session between the backup and its client. However, this identification can be accomplished by any known method. One such alternative way to accomplish this is to exchange generated identifiers at the time the session is established (i.e. when the communications channel or "pipe" is opened). For example, the backup can generate a unique identifier when it accepts a request for an open (connection request) from a new client (working process) and transmit that identifier to the client in its response. In subsequent communication the client (working process) can include that identifier at the beginning of each message, by means of which the backup can locate the correct storage to be used for that client.

The designated memory space is identified 730. This preferably is done by the generic backup process by changing memory maps using a virtual memory manager, as known in the art. The stack information 420 is stored. At a decision step 750 it is determined whether there is more data. If there is more data 750, the next MUP is processed 760. Whether or not there is more data is preferably determined by referring to the length 615. If there is no more data 750, a read is posted on the connection to the original working process 770.

Figure 12:
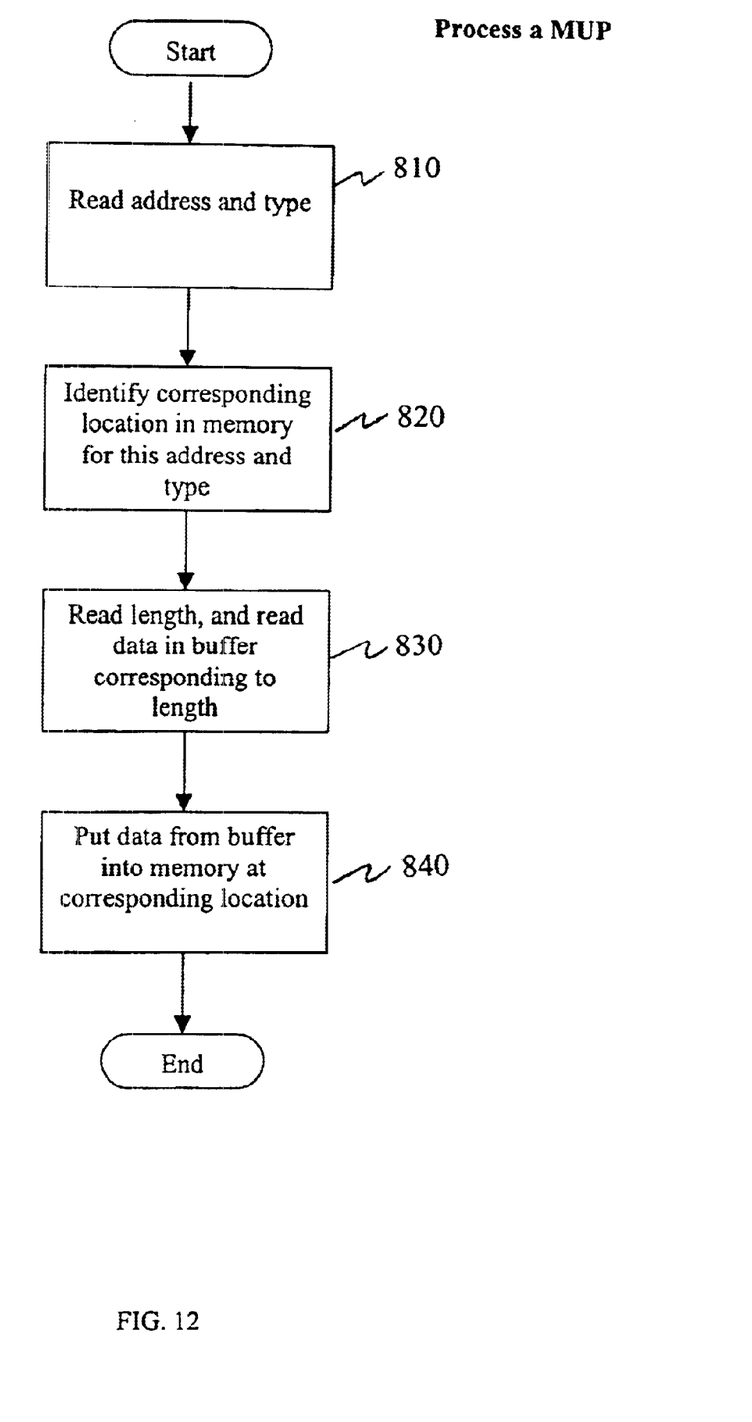
FIG. 12 is a process flow diagram of processing a MUP.

FIG. 12 is a process flow diagram for processing a MUP. The address 611 and type 613 are read 810. The location in the designated memory space corresponding to the address and type is identified 820. For instance, in one embodiment virtual memory is used and the memory manager unit makes physical addressing transparent to application programs. On such a machine, the type field is used to identify the base address for this type of data, e.g. the base address of the heap, and the location used to store data for a heap MUP is offset relative to the heap base address.

The length is read and the data in the buffer corresponding to the length is read 830. The data is put into the identified location in the designated memory space 840.

Figure 13:
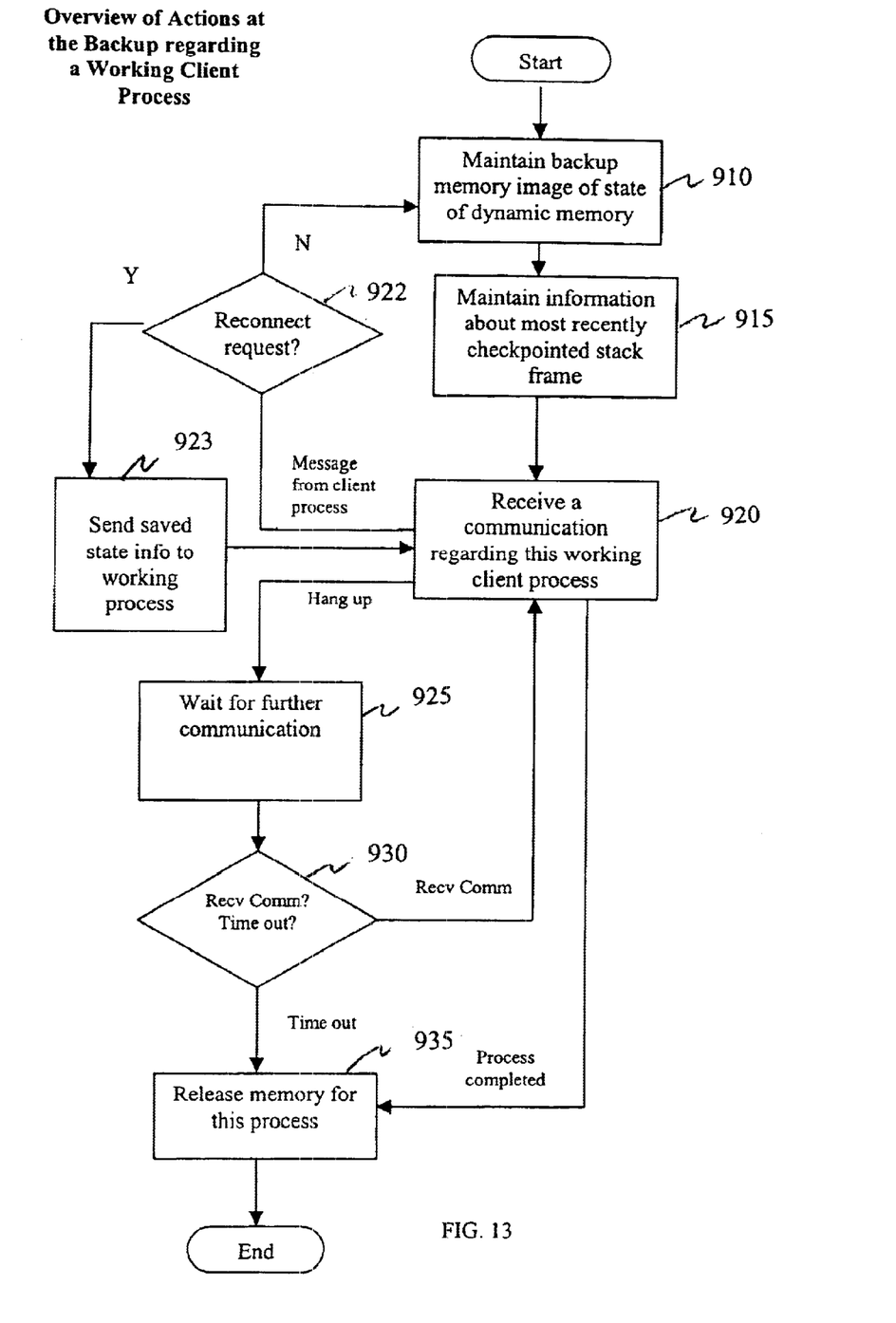
FIG. 13 is a process flow diagram of the actions of a generic backup process.

FIG. 13 is a process flow diagram showing an overview of actions taken by the generic backup process regarding an original working process in an embodiment. A backup memory image is maintained of the state of the dynamic memory of the original working process 910. Information about the most recently checkpointed stack information is maintained 915. This can be done by storing the stack information from the most recently received message from the original working process. A communication regarding the working process is received 920. If the communication is a message from an original working process (i.e. is not a hangup), the process proceeds to a decision step 922 where it is determined whether the communication is a reconnect request from a new incarnation of a working process that previously failed. If it is not a reconnect request, the method proceeds to maintain the memory image 910. If it is a reconnect request, the method proceeds to a step 923 where the new working process and the backup communicate to send the saved state information to the new working process.

If the communication received at step 920 is an indication that the original working process has failed, such as a SIGHUP on the open file handle used to communicate between the original working process and the backup, the process proceeds to wait for further communication for a configurable length of time 925. The length of time that it is appropriate to wait depends on the working process. If no communication is received for the length of time configured, a time out occurs 930 and the memory associated with the original working process by the generic backup process is released 935. If instead a communication is received before time out 930, the process returns to the receive communication step 920.

Figure 14A:
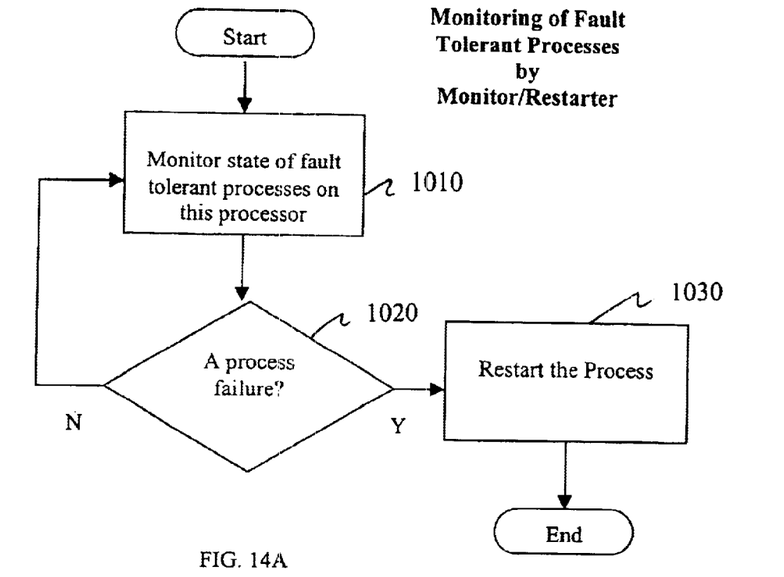
FIG. 14A is a process flow diagram of monitoring of a fault tolerant process.

Referring to FIG. 14A, the original working processes are monitored. In an embodiment, a monitor/restarter process does this. There can be more than one monitor/restarter process, each monitoring zero or more original working processes. The monitor can be a system monitor that can start and stop application processes. For example, some operating systems include a progenitor process that receives notification whenever any process fails. This normally is done by way of an operating system signal or IPC message. Such a progenitor process can be expanded to act as a monitor/restarter process by including into its specification knowing whether a process is a fault-tolerant process of the type discussed in this application, and having instructions to restart such a process if it fails.

Referring to FIG. 14A, the state of one or more fault tolerant processes is monitored 1010. In a preferred embodiment, there is one monitor/restarter process on each processor and the monitor/restarter process monitors original working processes running on that processor. Whether there is a process failure is monitored 1020. If there is a process failure, the process is restarted at the most recent checkpoint 1030. In one embodiment, the process can be restarted on the processor it was running on. In another embodiment, the process can be restarted on any available processor.

Figure 14B:
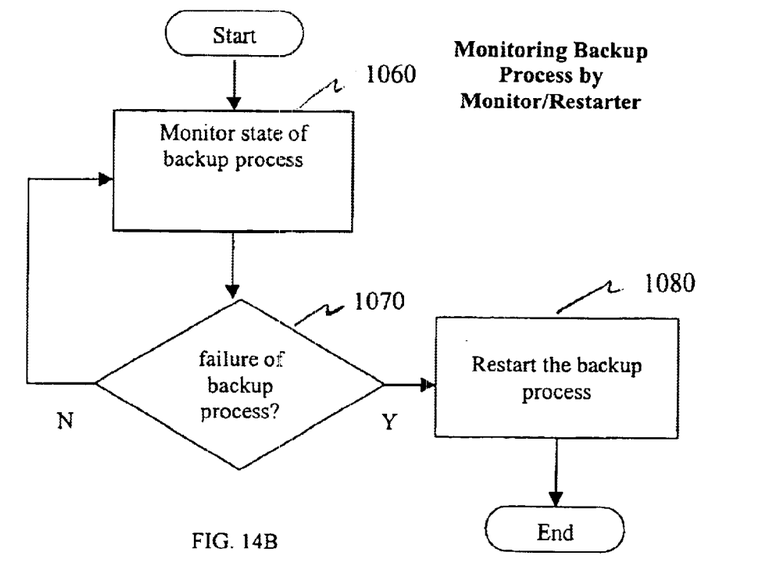
FIG. 14B is a process flow diagram of monitoring of a backup process.

Similarly, the state of the backup process is monitored and the backup process restarted. Note that it is not necessary that monitoring of the backup process be done, but if not done, then the method is vulnerable to failure of the backup process, which in practical application is likely to be unacceptable. In one embodiment, monitoring is done by the same monitor/restarter that monitors other working processes on a processor that the backup process is running on, such as described with regard to FIG. 14A, but is can also be done by another process. Referring to FIG. 14B, the state of the backup process is monitored at a step 1060. If the backup process fails as determined at a decision step 1070, the monitor/restarter restarts the backup process. The monitor/restarter preferably restarts the backup process just at it would restart other processes, i.e. each client (working process) of the backup preferably receives notification that the backup has failed (via, for example, a SIGHUP on the open file handle used to communicate between the client and the backup). When the backup has restarted, each client of its ancestor reconnects to it via a file system "open". The backup's memory is rebuilt and restored to its prior state, preferably by each client retransmiting its entire state (e.g. stack and heap memory) to the backup. Clients (working processes) and backup then continue normal operation.

Figure 15:
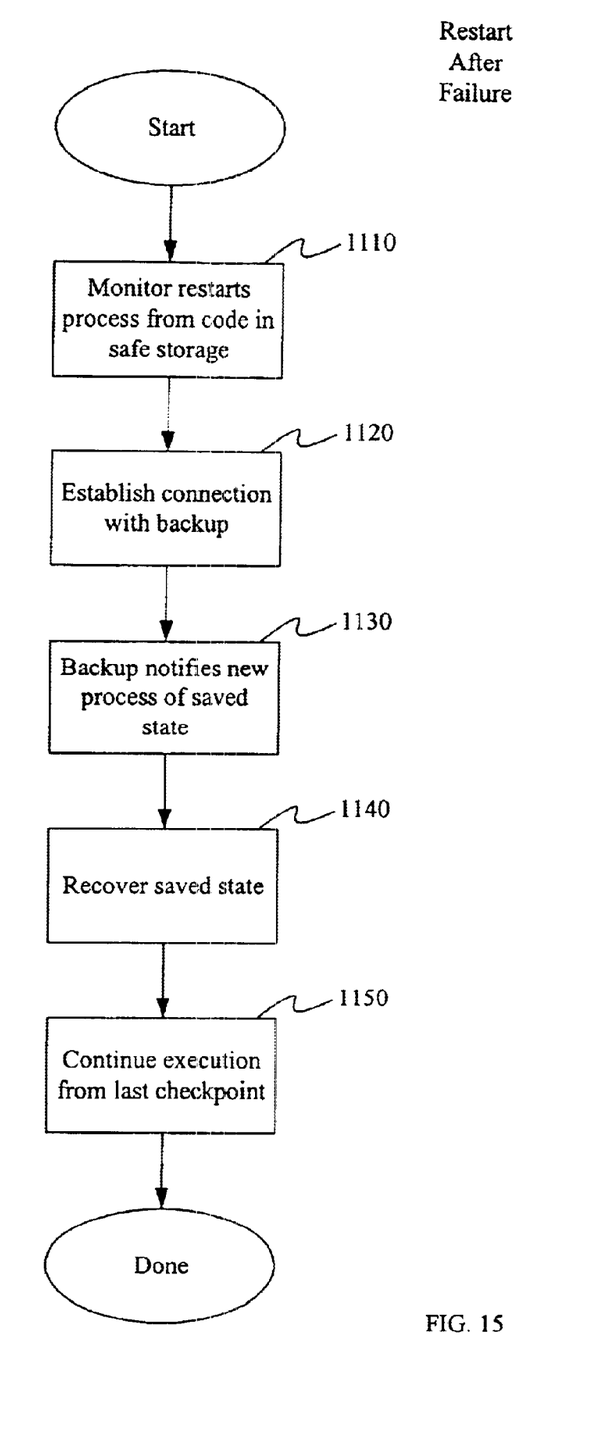
FIG. 15 is a process flow diagram of restarting a working process.

FIG. 15 is a process flow diagram of a restart procedure. The monitor/restarter process reads the code segment for the original working process is from safe storage and restarts the failed process at a step 1110, thereby generating a new working process. Prior to the restart, a new memory space for the original working process is obtained from the operating system of the processor on which the restored process is to run. This can be the processor on which the original working process was running, but alternately can be any available processor. For instance, referring to FIG. 2, a process originally run on a processor 51 can be restored and run on the same processor 51 or a different processor 61. A further example, referring to FIG. 3, is that a process originally run on one of the processors of computer system 1 can be restored on a processor on another of the computer systems 1.

The new working process establishes a connection with the backup and identifies itself to the backup at a step 1120. (Step 1120 corresponds to step 922 of FIG. 13, where the backup can receive a reconnect request.) The backup notifies the new working process there is saved state information from a previous incarnation of the working process at a step 1130. The working process recovers the saved state at a step 1140, which can be accomplished by reading one or more messages from the generic backup containing the saved state. During this procedure, memory images are transferred from the generic backup into appropriate locations in the new working process (e.g. stack and heap memory). (Steps 1130–1140 correspond to step 923 of FIG. 13 where the backup sends saved state information to the new working process.) After all the memory has been recovered, the new working process' stack frame is overwritten with the last stack frame checkpointed by its ancestor process (i.e., the most recently checkpointed stack information is loaded into the top of the stack in the new memory space and the program counter value is loaded into the top of stack memory.). A return is executed 1150. Executing a return from the top of stack results in control being transferred to the point that the ancestor working process was executing at the time it performed the final checkpoint prior to its failure. In one embodiment, the recovery steps executed by the new working process, such as the return in step 1150, are done by a special procedure included in the new working process.

It is important to note that although use of the return mechanism at step 1150 is a convenient way to restore the program counter to the state it was in at the completion of the last checkpoint operation performed by the working process, this can be accomplished by other methods, which can be architecture and instruction set dependent. For example, some architectures allow other methods for modifying a program's program register, including for example a "Set P" instruction. As a further alternative method that can be used, in some architectures the P register can be directly set and then a P relative JUMP instruction can be executed.

While the above is a complete description of preferred embodiments of the invention, various alternatives, modifications, and equivalents can be used. It should be evident that the invention is equally applicable by making appropriate modifications to the embodiments described above. For example, the flowcharts are exemplary embodiments but steps may be added, deleted, combined, and reordered without departing from the spirit and scope of the invention. The functions performed by the generic backup process can be combined with those of the monitor/restarter process and performed by a single process, or can be divided and performed by multiple processes. Therefore, the above description should not be taken as limiting the scope of the invention that is defined by the metes and bounds of the appended claims along with their full scope of equivalents.

The foregoing describes embodiments of an invention that can significantly reduce the amount of memory required to run a process as a fault tolerant process. Only the working copy of the code segment is loaded in memory, no redundant copy is maintained in memory. Although the special purpose programs require memory, they have relatively limited functions and the memory required is small compared to the code segment of a typical process that is desired to be made fault tolerant. In addition, each special purpose program can service multiple working processes, which increases efficiency and lowers the per working program overhead. Reducing memory has important applications including use in routers, switches, and other computer based information systems. The system addresses software failure which is a primary source of failure using current technology; currently used hardware is robust.

I claim:

1. A method for enabling recovery of an original working process upon failure including:
   obtaining state information associated with the original working process;
   obtaining a copy of a code segment associated with the original working process;
   loading the code segment into a portion of a memory space; and
   causing the code segment to execute as an active working process, responsive to said state information;
   wherein obtaining state information comprises:
      obtaining a backup memory image of the original working process; and
      obtaining current stack frame information of the original working process; and
      wherein causing the code segment to execute comprises:
         associating information in the backup memory image with the code segment;
         associating said current stack frame information with the code segment; and
         executing a return into the code segment in response to the current stack frame information.

2. A method for enabling recovery of an original working process upon failure including:
   obtaining state information associated with the original working process;
   obtaining a copy of a code segment associated with the original working process;
   loading the code segment into a portion of a memory space; and
   causing the code segment to execute as an active working process, responsive to said state information;
   wherein obtaining state information comprises:
      obtaining a backup memory image of the original working process; and
      obtaining current stack frame information of the original working process; and
      wherein causing the code segment to execute comprises:
         associating information in the backup memory image with the code segment;
         associating said current stack frame information with the code segment; and
         restoring a program counter responsive to the state information.

3. A method for enabling recovery of an original working process upon failure including:
   obtaining state information associated with the original working process;
   obtaining a copy of a code segment associated with the original working process;
   loading the code segment into a portion of a memory space; and
   causing the code segment to execute as an active working process, responsive to said state information;
   wherein obtaining state information comprises:
      obtaining a backup memory image of the original working process; and
      obtaining current stack frame information of the original working process; and
      wherein causing the code segment to execute comprises:
         associating information in the backup memory image with the code segment;
         associating said current stack frame information with the code segment; and
         restoring a program counter to a state associated with a last checkpoint prior to the failure.

4. A method for generically providing backup for a plurality of working processes comprising:
   for each of said plurality of working processes performing:
      opening a connection;
      designating a memory space;
      receiving a plurality of messages on the connection; and
      for each of the plurality of messages that is a memory update message,
   updating the contents of the memory space in response to said each of the plurality of messages; and
   for each of the plurality of messages that is a reconnect request indicating previous working process failure, sending information in said memory space to a source of the reconnect request.

5. A method as in claim 4 comprising:
   for each of the plurality of messages that is a reconnect request indicating previous working process failure,
      in response to the reconnect request, obtaining a copy of a code segment associated with said each of said plurality of working processes;
      loading said copy;
      executing into said copy responsive to information in said memory space.

6. A method as in claim 4 wherein said memory space does not include a code segment for any of said plurality of working processes.

7. A system for generically providing backup for a plurality of working processes comprising:
   a processing system;
   a memory storing code for operating said processing system, said code comprising:
      computer code that, for each of said plurality of working processes, opens a connection;
      computer code that, for each of said plurality of working processes, designates a memory space;
      computer code that, for each of said plurality of working processes, receives a plurality of messages on the connection;
      computer code, that for each of said plurality of working processes, for each message that is a memory update message updates the contents of the memory space in response to said each of the plurality of messages; and
      computer code, that for each of said plurality of working processes, for each of the plurality of messages that is a reconnect request indicating previous working process failure, sends information in said memory space to a source of the reconnect request.

8. A method as in claim 1, wherein associating information in the backup memory image includes copying said backup memory image into a second portion of said memory space.

9. A method as in claim 8, wherein said second portion of said memory space after said copying includes a stack image having a top, and wherein associating said current stack frame information includes putting a most recent portion of said current stack frame information into the top of the stack image.

10. A method as in claim 1, wherein associating the information relating to said current stack frame information includes putting a most recent program counter value into a currently executing stack frame associated with said code segment.

11. A method as in claim 1, wherein said information relating to said current stack frame information includes a most recent program counter value and said executing is done into the code segment at said most recent program counter value.

12. A method for enabling recovery of an original working process including:
  maintaining state information associated with the original working process;
  upon failure of the original working process, performing:
    obtaining a copy of a code segment associated with the original working process;
    loading the code segment into a portion of a memory space; and
    causing the code segment to execute as an active working process, responsive to said state information; and
  wherein said maintaining said state information includes:
    maintaining a backup memory image associated with the original working process; and
    maintaining current stack frame information associated with the original working process.

13. A method as in claim 12, wherein said current stack frame information includes a program counter value.

14. A method as in claim 13, wherein said current stack frame information further includes environmental information.

15. A method as in claim 13, wherein said current stack frame information further includes a stack frame marker.

16. A method for enabling recovery of an original working process including:
  maintaining state information associated with the original working process;
  upon failure of the original working process, performing:
    obtaining a copy of a code segment associated with the original working process;
    loading the code segment into a portion of a memory space; and
    causing the code segment to execute as an active working process, responsive to said state information; and
  wherein said state information includes dynamic memory information and a program counter value.

17. A method for enabling recovery of an original working process including:
  maintaining state information associated with the original working process;
  upon failure of the original working process, performing:
    obtaining a copy of a code segment associated with the original working process;
    loading the code segment into a portion of a memory space; and
    causing the code segment to execute as an active working process, responsive to said state information; and
  wherein said maintaining state information includes:
    receiving checkpoint information including current stack frame information from the original working process;
    modifying a backup memory image associated with the original working process in response to the checkpoint information;
    storing said current stack frame information.

18. A system as in claim 1, wherein the original working process is included in a memory included in a router.

19. A system for running fault-tolerant software including:
  a processing system;
  a memory storing code for operating said processing system, said code comprising:
    a generic backup module;
    an original working process in communication with the generic backup module;
    a monitor module, capable of monitoring the run state of the original working process;
    a nonvolatile storage device including a code segment associated with the original working process, information on said nonvolatile storage device accessible to said monitor module;
    a code segment associated with the original working process stored on said nonvolatile storage device.

20. A system as in claim 19, wherein the generic backup module is capable of backing up a plurality of original working processes.

21. A system as in claim 19, wherein the system includes a plurality of original working processes, and a plurality of code segments.

22. A system as in claim 19, wherein the system includes a plurality of monitor modules, each of said plurality of monitor modules capable of monitoring a plurality of original working processes.

23. A system as in claim 19, wherein the processing system includes a single processor unit.

24. A system as in claim 19, wherein the processing system includes two processor units.

25. A system as in claim 24, wherein one of the two processor units runs the original working process and another one of the two processor units runs the generic backup module.

26. A system as in claim 24, wherein the original working process and the monitor module run on a same one of the two processor units.

27. A system as in claim 19, wherein the processing system includes three or more processor units.

28. A system as in claim 19, wherein the processing system is included in a router.

29. A system for running fault-tolerant software including:
  a first processor including a generic backup module;
  a second processor including a original working process, the second processor coupled to the first processor, the original working process in communication with the generic backup module;
  a third processor including a monitor module, the third processor coupled to the second processor, the monitor module capable of monitoring a run state of the original working process; and
  a nonvolatile storage device including a code segment associated with the original working process, information on said nonvolatile storage device accessible by said third processor.

30. A system as in claim 29, wherein the first processor and the second processor are a same processor.

31. A system as in claim 29, wherein the second processor and the third processor are a same processor.

32. A system as in claim 29, wherein the first processor and the third processor are a same processor.

33. A system as in claim 29, wherein the first processor, second processor and the third processor are a same processor.

34. A computer program product for enabling recovery of an original working process comprising:

> computer code that maintains state information associated with the original working process by maintaining a backup memory image associated with the original working process and maintaining current stack frame information associated with the original working process;
>
> computer code that, upon failure of the original working process,
>
> > obtains a copy of a code segment associated with the original working process;
> > loads the code segment into a portion of a memory space; and
> > causes the code segment to execute as an active working process, responsive to said state information; and
>
> a computer readable medium that stores the computer code.

35. The computer program product of claim 34, wherein the computer readable medium is a CD-ROM, floppy disk, tape, flash memory, system memory, hard drive, or data signal embodied in a carrier wave.

36. A computer program product for generically providing backup for a plurality of working processes, comprising:

> computer code that, for each of said plurality of working processes, opens a connection;
>
> computer code that, for each of said plurality of working processes, designates a memory space;
>
> computer code that, for each of said plurality of working processes, receives a plurality of messages on the connection;
>
> computer code, that for each of said plurality of working processes, for each message that is a memory update message updates the contents of the memory space in response to said each of the plurality of;
>
> computer code, that for each of said plurality of working processes, for each of the plurality of messages that is a reconnect request indicating previous working process failure, sends information in said memory space to a source of the reconnect request; and
>
> a computer readable medium that stores the computer codes.

37. The computer program product of claim 36, wherein the computer readable medium is a CD-ROM, floppy disk, tape, flash memory, system memory, hard drive, or data signal embodied in a carrier wave.

38. A system for generically providing backup for a plurality of working processes comprising:

> for each of said plurality of working processes, means for opening a connection;
>
> for each of said plurality of working processes, means for designating a memory space;
>
> for each of said plurality of working processes, means for receiving a plurality of messages on the connection;
>
> for each of said plurality of working processes, for each message that is a memory update message, means for updating the contents of the memory space in response to said each of the plurality of messages; and
>
> for each of said plurality of working processes, for each of the plurality of messages that is a reconnect request indicating previous working process failure, means for sending information in said memory space to a source of the reconnect request.

* * * * *